United States Patent

Welschof

[11] Patent Number: 5,509,856
[45] Date of Patent: Apr. 23, 1996

[54] CONSTANT VELOCITY UNIVERSAL BALL JOINT WITH ASYMMETRIC CAGE

[75] Inventor: Hans-Heinrich Welschof, Rodenbach, Germany

[73] Assignee: GKN Automotive AG, Lohmar, Germany

[21] Appl. No.: 135,747

[22] Filed: Oct. 13, 1993

[30] Foreign Application Priority Data

Oct. 14, 1992 [DE] Germany .................. 42 34 488.3

[51] Int. Cl.⁶ .................................................. F16D 3/224
[52] U.S. Cl. ........................................ 464/145; 464/906
[58] Field of Search .......................... 464/145, 146, 464/906

[56] References Cited

U.S. PATENT DOCUMENTS

| | | | |
|---|---|---|---|
| 1,916,442 | 7/1933 | Rzeppa | 464/145 |
| 1,975,758 | 10/1934 | Stuber | 464/145 |
| 2,838,919 | 6/1958 | Cull | 464/145 |
| 3,298,201 | 1/1967 | Cadiou . | |
| 3,412,580 | 11/1968 | Cull | 464/145 |
| 4,432,741 | 2/1984 | Winkler | 464/145 |
| 4,846,764 | 7/1989 | Hazebrook et al. | 464/145 |

FOREIGN PATENT DOCUMENTS

| | | |
|---|---|---|
| 61-124732 | 6/1986 | Japan . |
| 9214943 | 9/1992 | WIPO . |

*Primary Examiner*—Daniel P. Stodola
*Assistant Examiner*—Eileen A. Dunn
*Attorney, Agent, or Firm*—Harness, Dickey & Pierce

[57] ABSTRACT

A constant velocity universal ball joint has an outer joint part with first ball tracks in its inner recess and an inner joint part with second ball tracks on its outer surface. The first and second tracks are uniformly circumferentially distributed and arranged opposite one another in pairs and each pair receives a torque transmitting ball. A ball cage holds the balls in a common plane (E) and includes unevenly distributed windows, whose number corresponds to the number of balls, in which the balls are arranged so as to be circumferentially movable. The windows have radial center lines respectively bisecting their circumferential length. In the cross-section through the ball cage with reference to a radial axis $(X_A)$, which coincides with the radial center line $(X_1, X_2)$ at least of one first window, and transverse axis $(X_Q)$, which is positioned perpendicularly to the radial axis $(X_A)$ and extends through the cage center, the respective shortest angular distances of the radial center lines $(X_n)$ of the remaining windows from the radial axis $(X_A)$ are reduced compared to the angular distances of the radii $(R_T)$ of a pitch circle with an equal angular spacing, which pitch circle corresponds to the number of windows and starts from the radial axis $(X_A)$. Also, the respective shortest angular distances of the radial center lines $(X_n)$ of the remaining windows from the transverse axis $(X_Q)$ are increased compared to the angular distances of the radii $(R_T)$ of the pitch circle with an equal angular spacing, which pitch circle corresponds to the number of windows.

5 Claims, 4 Drawing Sheets

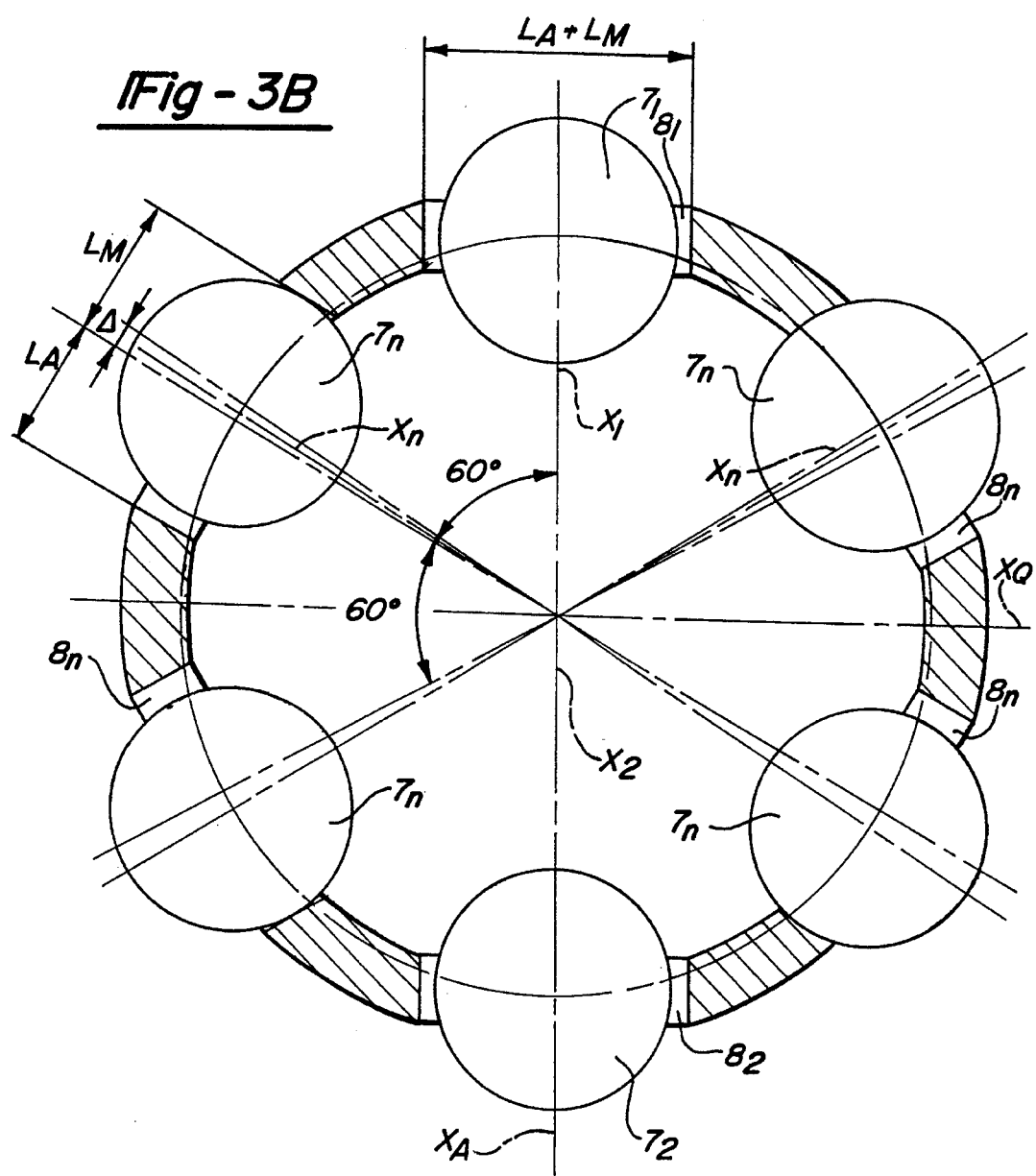

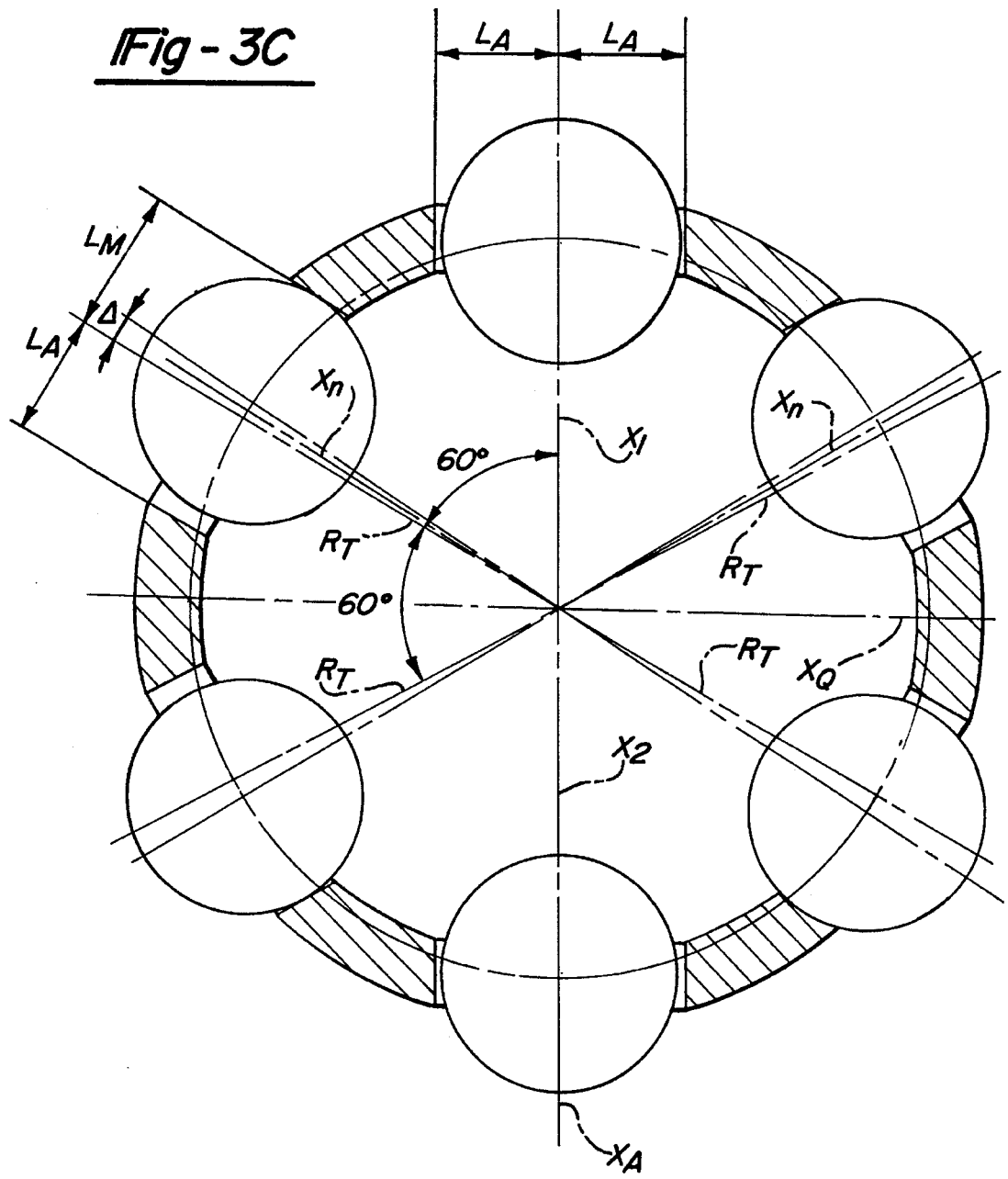

CONSTANT VELOCITY UNIVERSAL BALL JOINT WITH ASYMMETRIC CAGE

The invention relates to a constant velocity universal ball joint. The joint has an outer joint part with first ball tracks in its inner recess and an inner joint part with second ball tracks on its outer surface. The first and second tracks are uniformly circumferentially distributed and arranged opposite one another in pairs and each pair receives a torque transmitting ball. A ball cage holds the balls in a common plane. The cage includes windows whose number corresponds to the number of balls and in which the balls are arranged so as to be circumferentially movable. The windows have radial center lines bisecting their circumferential lengths.

BACKGROUND OF THE INVENTION

The definition given here covers RF (Rzeppa fixed) joints, DO (double offset) plunging joints and VL (Verschiebegelenk Löbro) plunging joints, each having an axial stop for the ball cage. Joints of this type are described in detail under the respective headings in "Gelenke und Gelenkwellen" by F. Schmelz et al, Springer-Verlag, Berlin, etc. 1988. The above-mentioned joints have one feature in common, they are fitted such that, with a preassembled joint including the outer joint part, inner joint part and ball cage in predetermined positions, the balls are individually fitted by setting an assembly angle ($\alpha_M$) which is greater than the maximum operating angle ($\alpha_A$). This means that the axes of the outer joint part and inner joint part are arranged at an angle relative to one another such that at least one of the ball windows of the cage freely emerges from the outer joint part so that it is possible for a ball to be inserted from the radial outside into the cage window and the respective track of the inner joint part. The assembly angle ($\alpha_M$) exceeds the maximum operating or working angle ($\alpha_A$) which is limited such that self acting dismantling of the joint in the reverse order by loosing balls cannot take place.

Whenever the joint is articulated, all balls of the joint, to the extent that their centers are not positioned on an axis extending perpendicularly relative to the plane of articulation, are circumferentially displaced relative to an assumed central axis ($X_n$) of their cage window bisecting the circumferential length. This means that when the joint rotates in an articulated condition, the individual balls carry out an oscillating movement in their respective ball windows in the longitudinal direction i.e. in the circumferential direction of the cage. The length of the ball windows is dimensioned such that the above-mentioned articulation can be achieved for fitting all balls.

The fracture strength of ball joints is largely determined by the fracture strength of the ball cage. In particular, the webs between the windows, which are limited by the above-mentioned assembly requirements, constitute the weakest points. Requested large joint operating angles require correspondingly large assembly angles the size of which is limited in view of the reduced web width resulting from larger windows. The strength requirements regarding the width of the webs between the windows also do not allow a desirable increase in the size of the balls with a certain joint size for the purpose of increasing the torque capacity.

SUMMARY OF THE INVENTION

It is an object of the present invention to improve constant velocity universal ball joints of the above-mentioned type such that, with a predetermined ball size, the fracture strength of the ball cages can be increased. This also means that the ball size and thus the torque capacity can be increased without adversely affecting the fracture strength of the ball cage.

This objective is achieved by the windows in the ball cage being unevenly distributed across the cage circumference. In the cross-section through the ball cage with reference to a radial axis $X_A$, which coincides with the radial center line $X_1$, $X_2$ at least of one first window, and a transverse axis $X_Q$, which is positioned perpendicularly to the radial axis $X_A$ and extends through the cage center, the respective shortest angular distances of the radial center lines $X_n$ of the remaining windows from the radial axis $X_A$ are reduced compared to the angular distances of the radii $R_T$ of a pitch circle with an equal angular spacing, which pitch circle corresponds to the number of windows and starts from the radial axis $X_A$. Also, the respective shortest angular distances of the radial center lines $X_n$ of the remaining windows from the transverse axis $X_Q$ are increased compared to the angular distances of the radii $R_T$ of the pitch circle with an equal angular spacing, which pitch circle corresponds to the number of windows. If there was a window diametrically opposite said at least one first window, this would mean another first window by all definitions and descriptions referred thereto.

In accordance with the invention, it is possible to increase the width of the webs between the cage windows without in any way changing the joint function or the method of assembly, while retaining the joint configuration and especially with the same operating angle of articulation and assembly angle of articulation.

Each of the webs between the windows may be broadened, compared to a cage according to the state of the art, and the at least one window at its both and the remaining windows at their respective ends positioned opposite the one first window are shortened. As compared to radii on a pitch circle with an equal angular spacing, the respective radial center line of the remaining windows is displaced as a result. This is achieved by the arbitrary assembly sequence for the balls followed in the case of the previously uniform distribution of windows across the circumference is no longer observed and it is no longer possible for each ball window to pivot freely by setting the assembly angle in any plane when the balls are inserted.

On the contrary, the joints in accordance with the invention have to be assembled in such a sequence that the at least one window mentioned first is provided with a ball last by setting the assembly angle in the plane containing the window. The ball may be inserted in the center of the window so that the length of the window may be limited to the operating range as such, which means that at both ends the length of the window may be shortened by the amount provided so far for assembly purposes only. If the joint is articulated in a plane other than the plane defined by the mentioned window, the window length limited to the operating range restricts any further joint articulation. Any balls in the remaining windows can thus not be introduced last or removed first.

When setting the assembly angle in the plane predetermined by the at least one first window, the balls in the other cage windows move in a certain known direction, towards the plane of articulation. It is only in this direction that the remaining windows, for the purpose of setting the assembly angle, require a greater length exceeding the operating range of the balls. In the respective opposite direction, the length of the windows, with reference to a central position when the joint is in the extended condition, may be limited to the operating range for the operating angle of the joint or to the length required for fitting a further ball in one of the remaining windows when some of the bails of the remaining windows have already been fitted.

In a first preferred embodiment, the individual cage windows all have the same circumferential length. This is particularly advantageous from a production-technical point of view because the windows can be produced by one single tool. With a view to shortening the windows as much as possible, the window length is then determined in that the length of the remaining windows in the circumferential direction corresponds to the ball diameter plus the length of the ball travel if the joint rotates at the maximum operating angle $\alpha_A$, plus the length required for moving the balls during assembly, if the assembly angle $\alpha_m$ in the plane is set by the radial axis $X_A$ after the balls have already been inserted into the remaining windows and when, as a last step, at least the one first window is provided with at least the one associated ball.

According to a second preferred embodiment it is also possible for the length of the at least one so-called first window in the circumferential direction to be shorter than that of the remaining windows. At least this one window is then shortened by the greatest possible amount in that the length of the at least one first window in the circumferential direction corresponds to the ball diameter plus the length of travel of the balls if the joint rotates at the maximum operating angle. In this embodiment, it is advantageous from a strength point of view for all webs between the windows to have the same length in the circumferential direction.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments of the invention are illustrated in the drawing wherein:

FIG. 3b is a cross sectional view of a first embodiment of a cage of a joint in accordance with the invention analogous to FIG. 3a.

FIG. 3c is a cross sectional view of a second embodiment of a cage of a joint in accordance with the invention analogous to FIG. 3a.

DETAILED DESCRIPTION OF THE PREFERRED EMBODIMENTS

Figure 1:
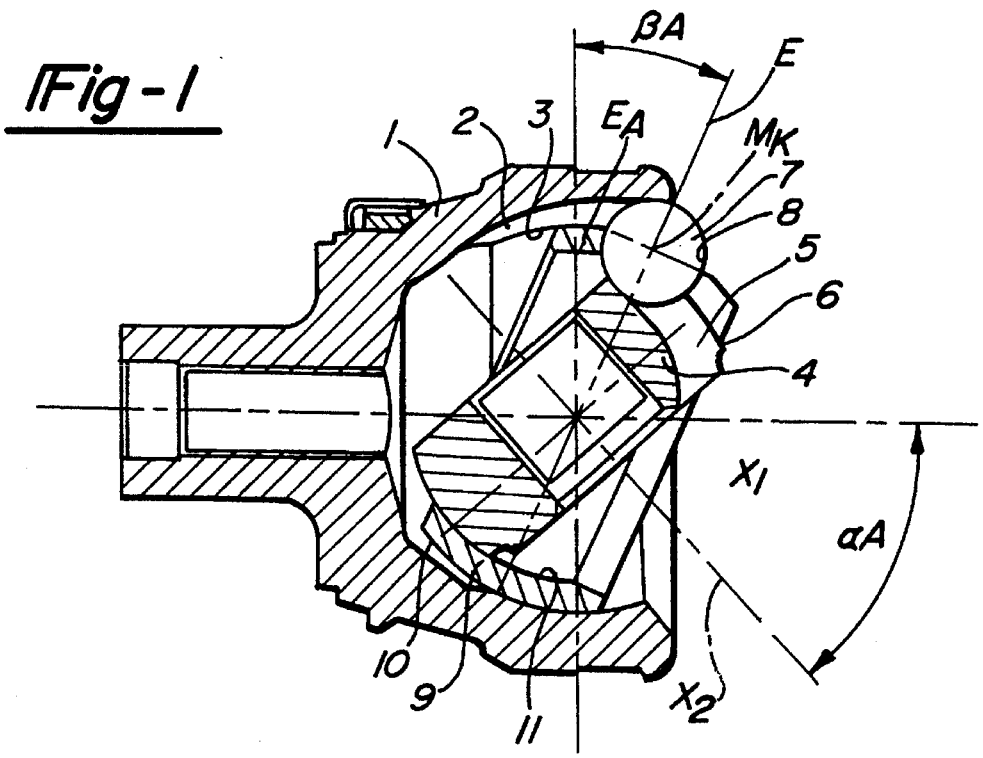
FIG. 1 is a cross sectional view of a joint in accordance with the invention articulated at the maximum operating angle $\alpha_A$.
Figure 2:
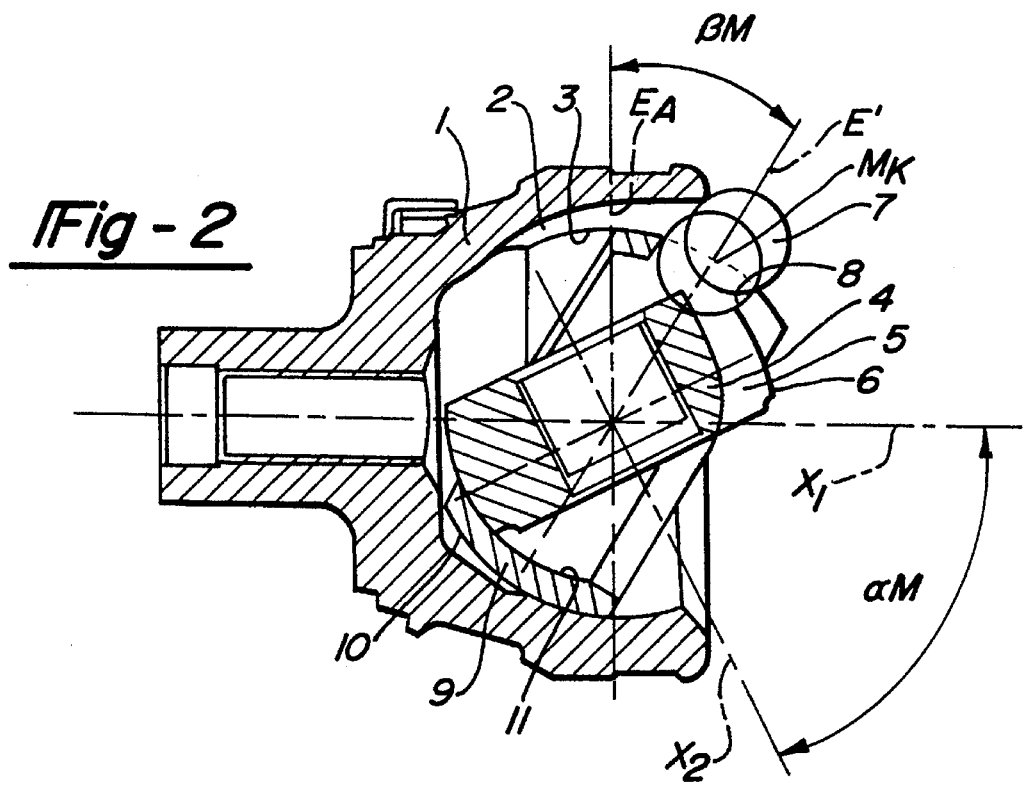
FIG. 2 is a cross sectional view of a joint in accordance with the invention articulated at the assembly angle $a_M$.

FIGS. 1 and 2, which below will be described jointly, illustrate a Rzeppa fixed joint. The joint includes an outer joint part 1 with first ball tracks 2 on its inner face 3 and an inner joint part 4 with second ball tracks 5 on its outer face 6. The ball tracks 3, 5, arranged in pairs, hold balls 7 which are guided in a clearance-free way in windows 8 of ball cage 9 in the sectional plane. The sectional plane at the same time constitutes the articulation plane of the joint in the position as illustrated, which plane extends between the axis $X_1$ of the outer joint part and the axis $X_2$ of the inner joint part. The cage holds the ball centers $M_K$ of all balls in a common plane E which extends perpendicularly relative to the drawing plane. The cage 9 is guided with its outer face 10 in the inner face 3 of the outer joint part 1 and with its inner face 11 on the outer face 6 of the inner joint part. The cage 9 is controlled onto the angle-bisecting plane by the balls 7 forced onto this plane by the track contact angle when the balls are positioned within the region of the articulation plane as shown.

In FIG. 1, the joint is articulated at its maximum operating angle $\alpha_A$. In this illustration, the plane E of all ball centers $M_K$ is positioned on the angle-bisecting line at the angle $\beta_A$ relative to the central plane $E_A$ of the outer joint part, which angle is half the size of the operating angle $\alpha_A$.

The ball 7 in the articulation plane is still held in the tracks 3, 6 by the outer joint part 1 and the inner joint part 4 as well as by the cage window 8 of the cage 9 in such a way that it cannot radially emerge.

In FIG. 2, the joint is articulated at the assembly angle $\alpha_M$. The plane E' of all ball centers $M_K$ has moved relative to the central plane $E_A$ of the outer joint part by the angle $\beta_M$ which is half the angle $\alpha_M$. In this position, the ball 7 is able to emerge radially from the cage window 8. The ball 7 can be fitted in this position and is not held or obstructed by the outer joint part 1.

Figure 3A:
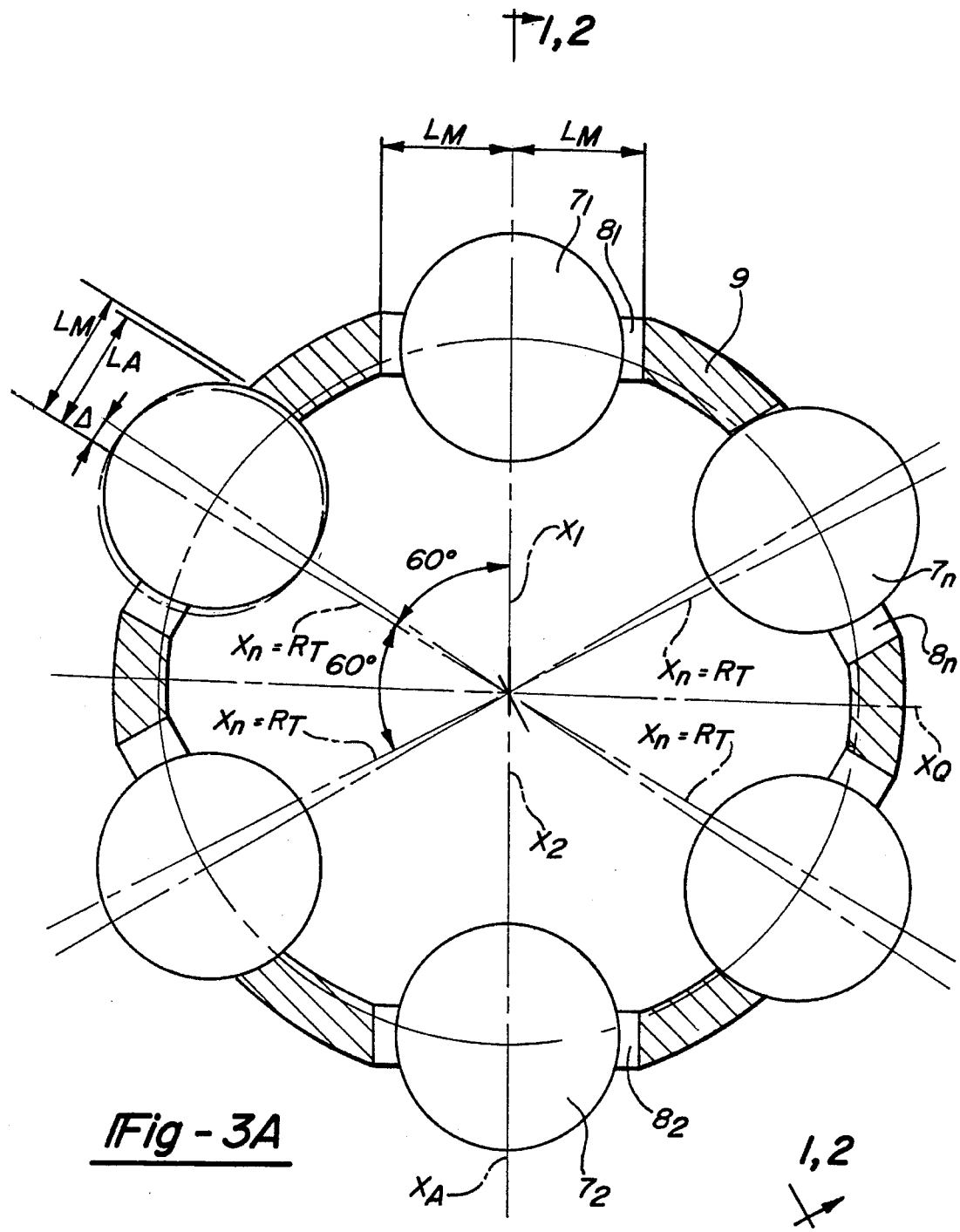
FIG. 3a is a cross sectional view of a cage in accordance with the state of the art whose balls are in the fitted condition.

FIG. 3a shows a detail section of the cage 9 and the position of the balls 7 relative to the cage 9 corresponds to that shown in FIG. 2. The Figure shows six cage windows 8 on a uniform pitch circle with a 60° division. The individual windows 8 are indicated by radial center lines $X_n$ which correspond to radii $R_T$ of an equal circle division. A radial axis $X_A$ defines an articulation plane positioned perpendicularly relative to the drawing plane, whereas the transverse axis $X_Q$, positioned perpendicularly thereon and extending through the cage center, defines the associated articulation axis. The upper ball $7_1$ and the opposed ball $7_2$ should be assumed to be balls positioned in the articulation plane. They are shown in a symmetric position relative to the first cage windows $8_1$, $8_2$ whose radial center lines $X_1$, $X_2$ coincide with the radial axis $X_A$. The remaining balls $7_n$ with reference to the corresponding remaining cage windows $8_n$ are shown in a position which they assume when the assembly angle $\alpha_M$ is reached. Relative to the central axis $X_n$, the balls are displaced in their window $8_n$ by the angular amount $\Delta$. Half the window length of all windows is thus $L_M$.

The dashed lines indicate the positions reached by the contours of the remaining balls 7 when the operating angle $\alpha_A$ of the joint is assumed. In this position, the ball contour is removed from the central axis $X_n$ of the cage window $8_n$ by the distance $L_A$ which constitutes half the operating range. As illustrated with reference to the cage window $8_1$ with the ball $7_1$, the circumferential length of each window is thus $2L_M$.

FIGS. 3b, 3c again show a radial axis $X_A$ and a transverse axis $X_Q$, the former being positioned in the articulation plane and the latter defining the articulation axis. Starting from the radial axis $X_A$, there are entered radii $R_T$ with an equal angular spacing corresponding to the number of windows. The radial center lines $X_1$, $X_2$ of first windows coincide with the radial axis $X_A$, whereas the radial center lines of the remaining windows deviate from the corresponding radii $R_T$ of an equal circle division.

In FIG. 3b, the remaining windows $8_n$, with reference to the original length according to FIG. 3a, are shortened by the amount $L_M-L_A$ at their ends adjoining one another in pairs, and in this direction, starting from the radius $R_T$ of an equal circle division, only the length $L_A$ of half the operating range remains, whereas the length $L_M$ required for setting the assembly angle, starting from the radius $R_T$ of an equal circle division, is provided only for joint articulation in the illustrated form in the opposite direction. The total length of these windows $8_n$ is $L_A+L_M$. There is thus obtained a new center line $X_n$ for the respective cage windows which deviates from the radii $R_T$ of an equal circle division, whereas the center lines $X_1$, $X_2$ of the two first windows remain unchanged.

At both ends, the length of the windows $8_1$, $8_2$ is shortened symmetrically relative to the unchanged central axis $X_1$, $X_2$ by $(L_M-L_A)/2$. According to this design, the windows are unevenly distributed in the circumferential direction, but are of equal length relative to one another, the advantage being that they can be produced by the same punching tool.

In FIG. 3c, the remaining windows $8_n$ for the remaining balls $7_n$ are shortened in the same way as shown in FIG. 3b. Again, the total window length is $L_A+L_M$, and there is obtained a new center line $X_N$ which deviates from the radii $R_T$ of an equal circle division, whereas the center lines $X_1$, $X_2$ of the two first windows remain unchanged. The two first windows $8_1$ and $8_2$ with their unchanged center lines $X_1$, $X_2$, at their both ends, are shortened by the amount $L_M-L_A$ to a total of $2 L_A$. In this way, there is obtained the shortest possible dimension for the length of the windows. The advantage of this design is that now all webs between the balls are uniformly increased in size in the circumferential direction and thus exhibit equal strength. In this case, however, the windows are of unequal length.

While the above detailed description describes the preferred embodiment of the present invention, the invention is susceptible to modification, variation, and alteration without deviating from the scope and fair meaning of the subjoined claims.

I claim:

1. A constant velocity universal ball joint comprising:
   an outer joint part with first ball tracks in an inner recess of said outer joint parts;
   an inner joint part with second ball tracks on an outer surface of said inner joint part, the first and second tracks being uniformly circumferentially distributed and arranged opposite one another in pairs and each pair receiving a torque transmitting ball;
   a ball cage holding the balls in a common plane, said cage including windows whose number corresponds to the number of balls and in which the balls are arranged so as to be circumferentially movable, said ball cage windows having radial center lines bisecting their circumferential length, said ball cage windows being unevenly distributed across the cage circumference, said windows including at least one first window having a first radial center line, and further windows having further radial center lines respectively, said cage having a radial first reference axis through the cage center and a transverse radial second reference axis through the cage center, perpendicularly intersecting said first reference axis, and reference radii with an equal angular spacing, each of said reference radii intersecting one of said windows, said first radial center line coinciding with said first reference axis; and
   one of said reference radii coinciding with said first reference axis, and all of said further center lines, which do not coincide with said second reference axis, having a shorter angular distance from said first reference axis than the one of said reference radii intersecting said windows.

2. A joint according to claim 1, wherein the length of all windows is the same in the circumferential direction.

3. A joint according to claim 1, wherein the length of at least the one first window in the circumferential direction is shorter than the length of the remaining windows.

4. A joint according to claim 1, wherein the length of at least the one first window in the circumferential direction corresponds to the ball diameter plus the length of the travel of the balls when the joint rotates at the maximum operating angle.

5. A joint according to claim 1, wherein the length of the remaining windows in the circumferential direction corresponds to the ball diameter plus the length of the ball travel when the joint rotates at the maximum operating angle plus the length required for moving the balls during assembly, when the assembly angle is set in the plane comprising the radial axis after all the balls have already been inserted into all of said remaining windows and when, as a last step, at least the one first window is provided with at least the one associated ball.

* * * * *